(12) United States Patent
Sanchez

(10) Patent No.: US 8,111,012 B2
(45) Date of Patent: Feb. 7, 2012

(54) METHOD AND FIRMWARE FOR CONTROLLING AN INVERTER VOLTAGE BY DRIVE SIGNAL FREQUENCY

(75) Inventor: Jorge Sanchez, Poway, CA (US)

(73) Assignee: Tecey Software Development KG, LLC, Dover, DE (US)

( * ) Notice: Subject to any disclaimer, the term of this patent is extended or adjusted under 35 U.S.C. 154(b) by 495 days.

(21) Appl. No.: 12/042,784

(22) Filed: Mar. 5, 2008

(65) Prior Publication Data

US 2008/0315797 A1    Dec. 25, 2008

Related U.S. Application Data

(60) Provisional application No. 60/893,102, filed on Mar. 5, 2007.

(51) Int. Cl.
*H05B 37/02* (2006.01)

(52) U.S. Cl. ......... 315/307; 315/276; 315/308; 315/312

(58) Field of Classification Search .......... 315/224–225, 315/276, 283, 291, 294, 297, 307–309, 312, 315/360
See application file for complete search history.

(56) References Cited

U.S. PATENT DOCUMENTS

| | | | |
|---|---|---|---|
| 4,663,704 A | 5/1987 | Jones et al. | |
| 5,315,214 A * | 5/1994 | Lesea | 315/209 R |
| 5,677,602 A * | 10/1997 | Paul et al. | 315/224 |
| 5,828,178 A * | 10/1998 | York et al. | 315/151 |
| 6,259,215 B1 * | 7/2001 | Roman | 315/307 |
| 6,362,575 B1 * | 3/2002 | Chang et al. | 315/224 |
| 6,429,546 B1 | 8/2002 | Ropp et al. | |
| 6,628,093 B2 * | 9/2003 | Stevens | 315/291 |
| 6,876,160 B1 * | 4/2005 | Stevens | 315/308 |
| 6,969,958 B2 * | 11/2005 | Henry | 315/291 |
| 6,979,959 B2 * | 12/2005 | Henry | 315/291 |
| 2003/0214827 A1 | 11/2003 | Ollila et al. | |
| 2004/0051473 A1 * | 3/2004 | Jales et al. | 315/276 |
| 2005/0189903 A1 | 9/2005 | Ku et al. | |
| 2006/0050264 A1 * | 3/2006 | Jung et al. | 356/73 |
| 2006/0279235 A1 * | 12/2006 | Gong et al. | 315/291 |
| 2007/0001617 A1 | 1/2007 | Pogodayev et al. | |
| 2007/0001999 A1 * | 1/2007 | Smith et al. | 345/102 |
| 2007/0007929 A1 | 1/2007 | Lee et al. | |
| 2007/0108919 A1 * | 5/2007 | Tsai et al. | 315/291 |
| 2007/0132398 A1 * | 6/2007 | Ferguson et al. | 315/159 |

OTHER PUBLICATIONS

International Search Report for PCT/US2008/055971 mailed Aug. 1, 2008.
Written Opinion of the International Searching Authority for PCT/US2008/055971 mailed Aug. 1, 2008.
International Preliminary Report on Patentability for PCT/US2008/055971 mailed Sep. 8, 2009.

* cited by examiner

*Primary Examiner* — Tung X Le
(74) *Attorney, Agent, or Firm* — Schwabe, Williamson & Wyatt, P.C.

(57) ABSTRACT

A method and firmware for controlling an inverter voltage includes steps of receiving as input a digitized feedback signal representative of an inverter voltage that varies with frequency according to a transfer function, calculating a frequency of a digital switch control signal in firmware in an inverter voltage microcontroller by the transfer function from the digitized feedback signal to adjust the inverter voltage to a set point value, and generating the digital switch control signal having the calculated frequency by firmware in the inverter voltage microcontroller as output to generate the inverter voltage at the set point value.

35 Claims, 9 Drawing Sheets

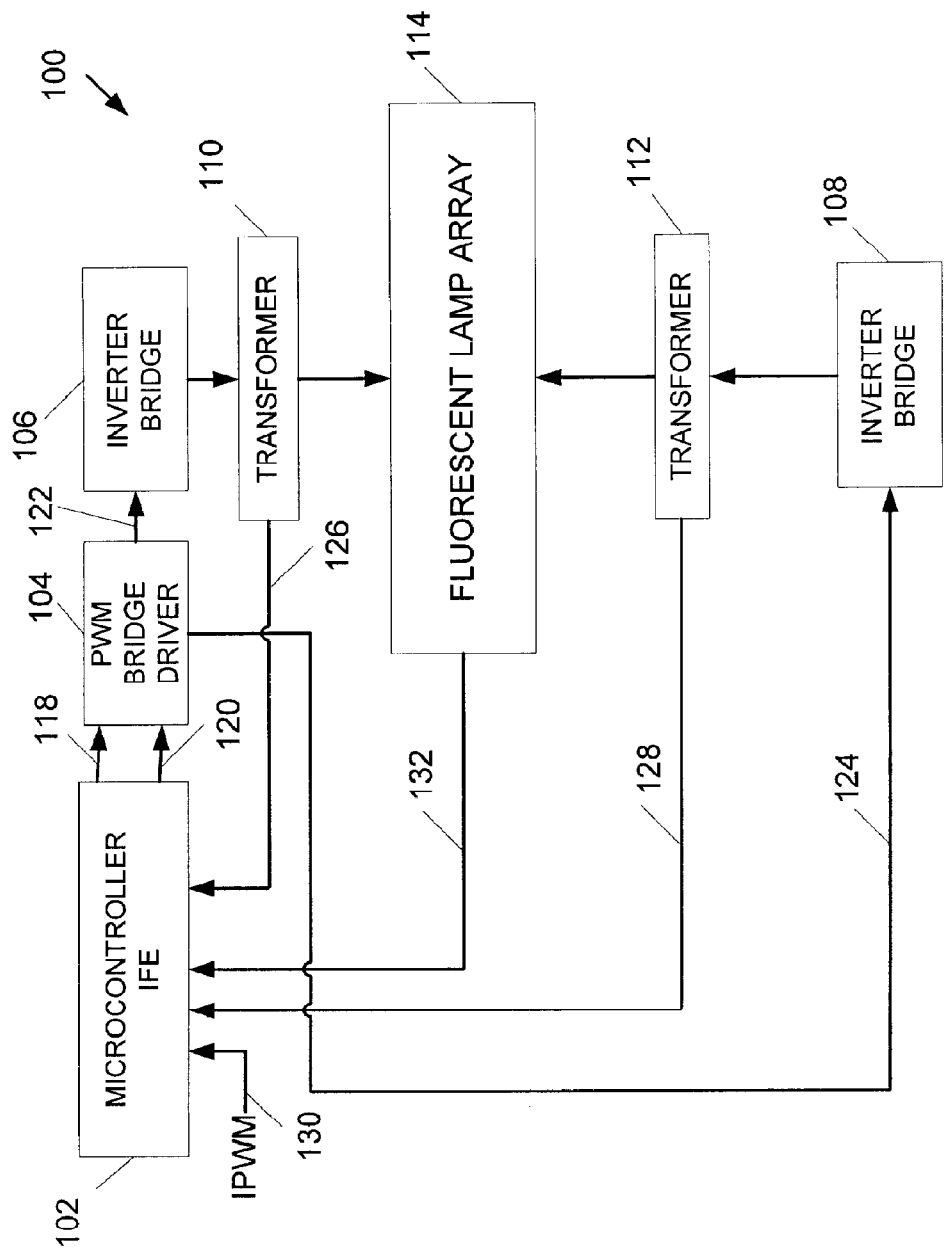
FIG._1

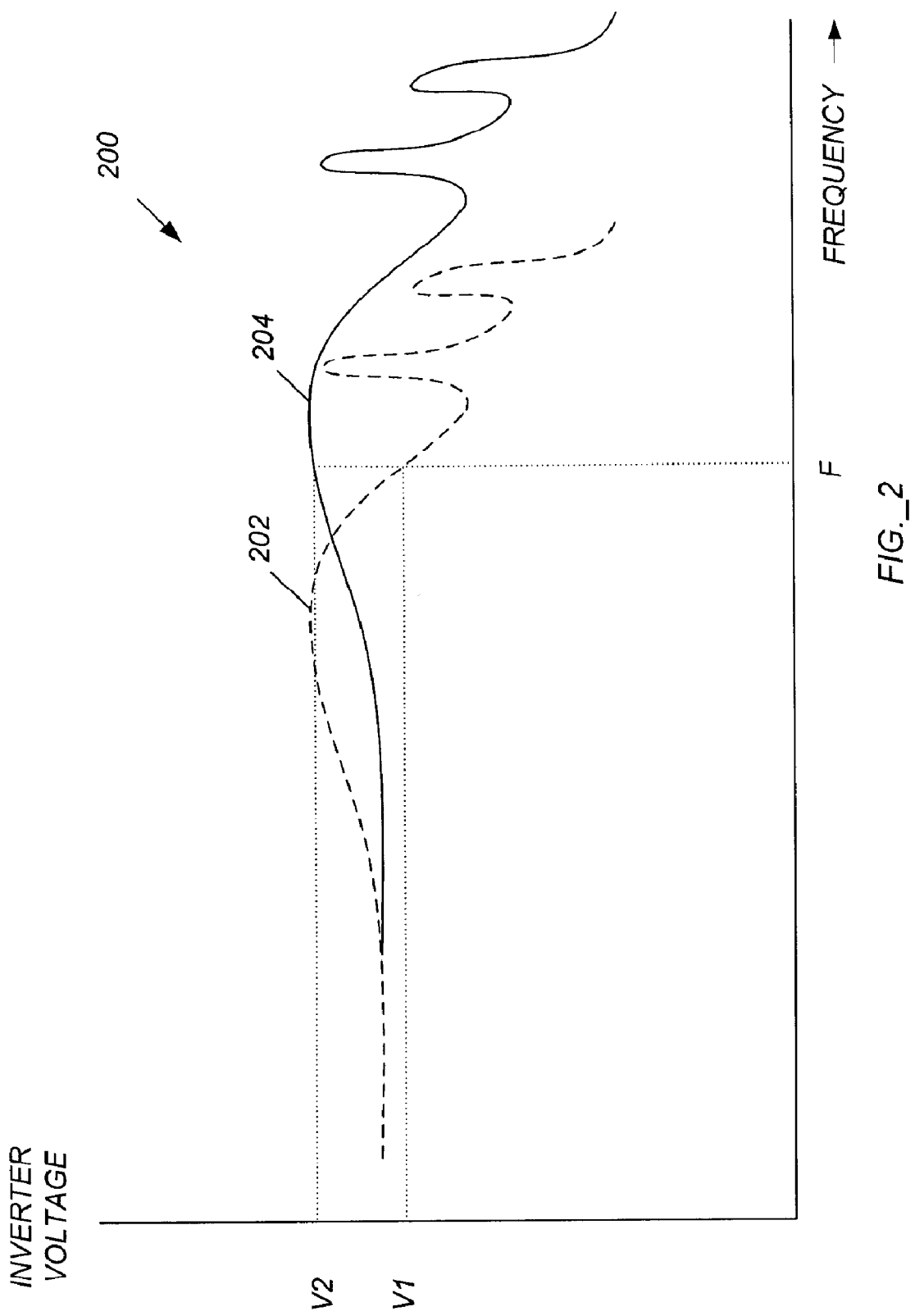
FIG._2

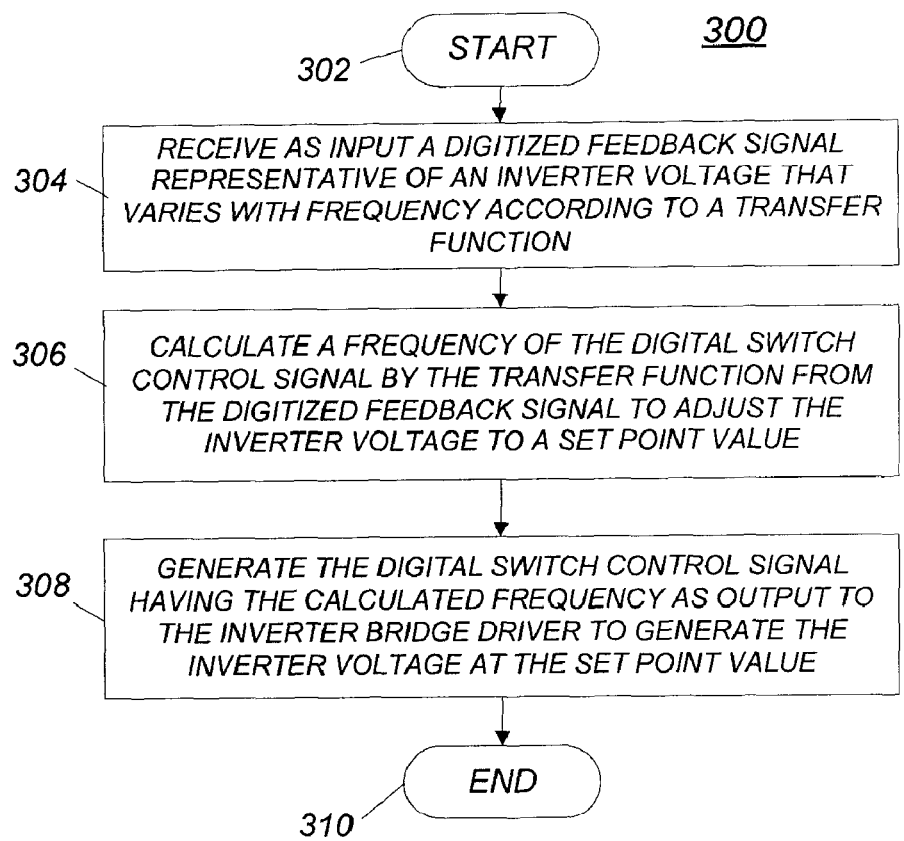
FIG._3
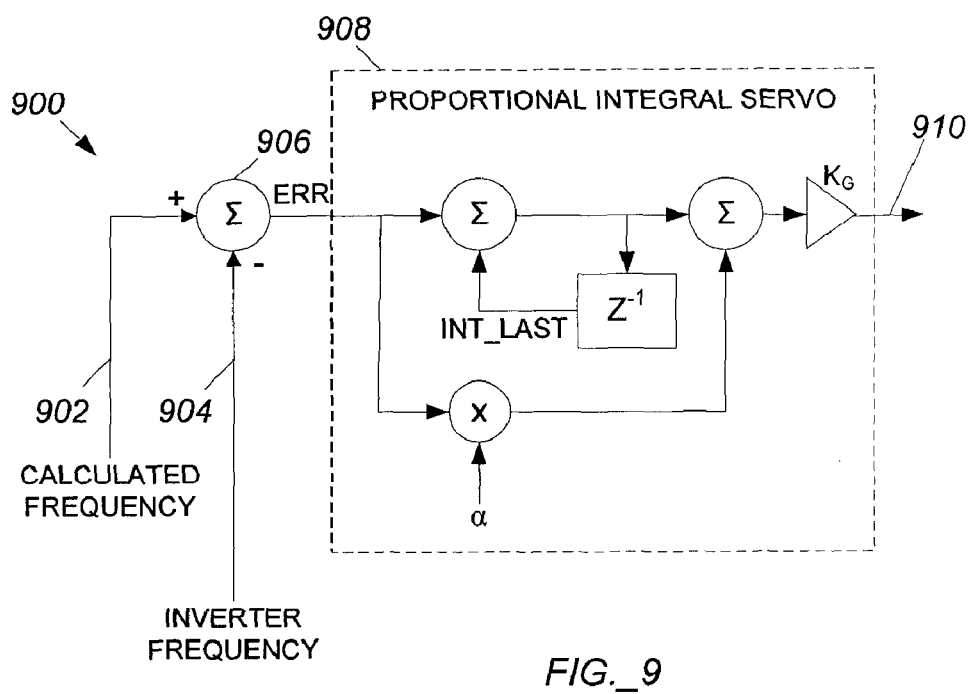
FIG._9

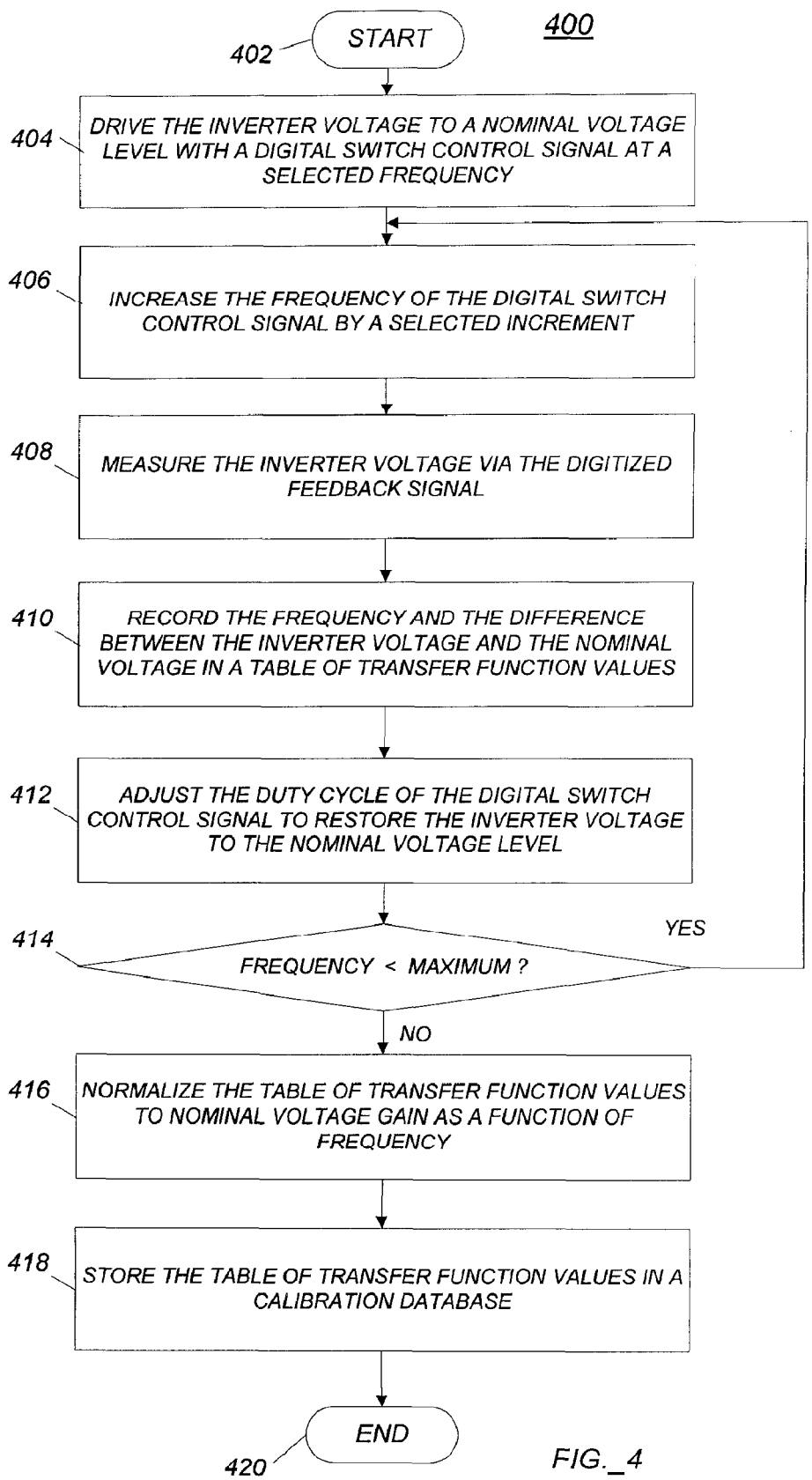
FIG._4

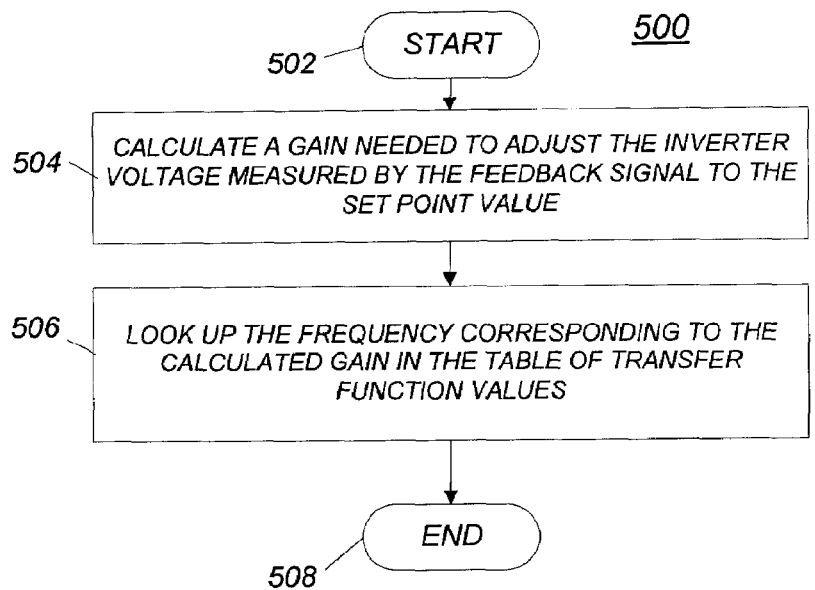
FIG._5
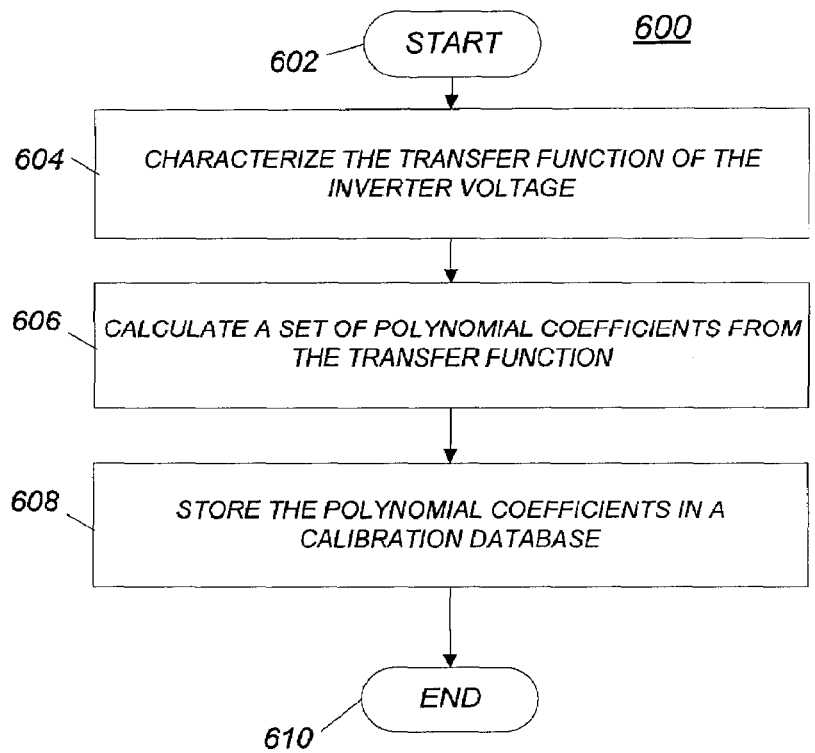
FIG._6

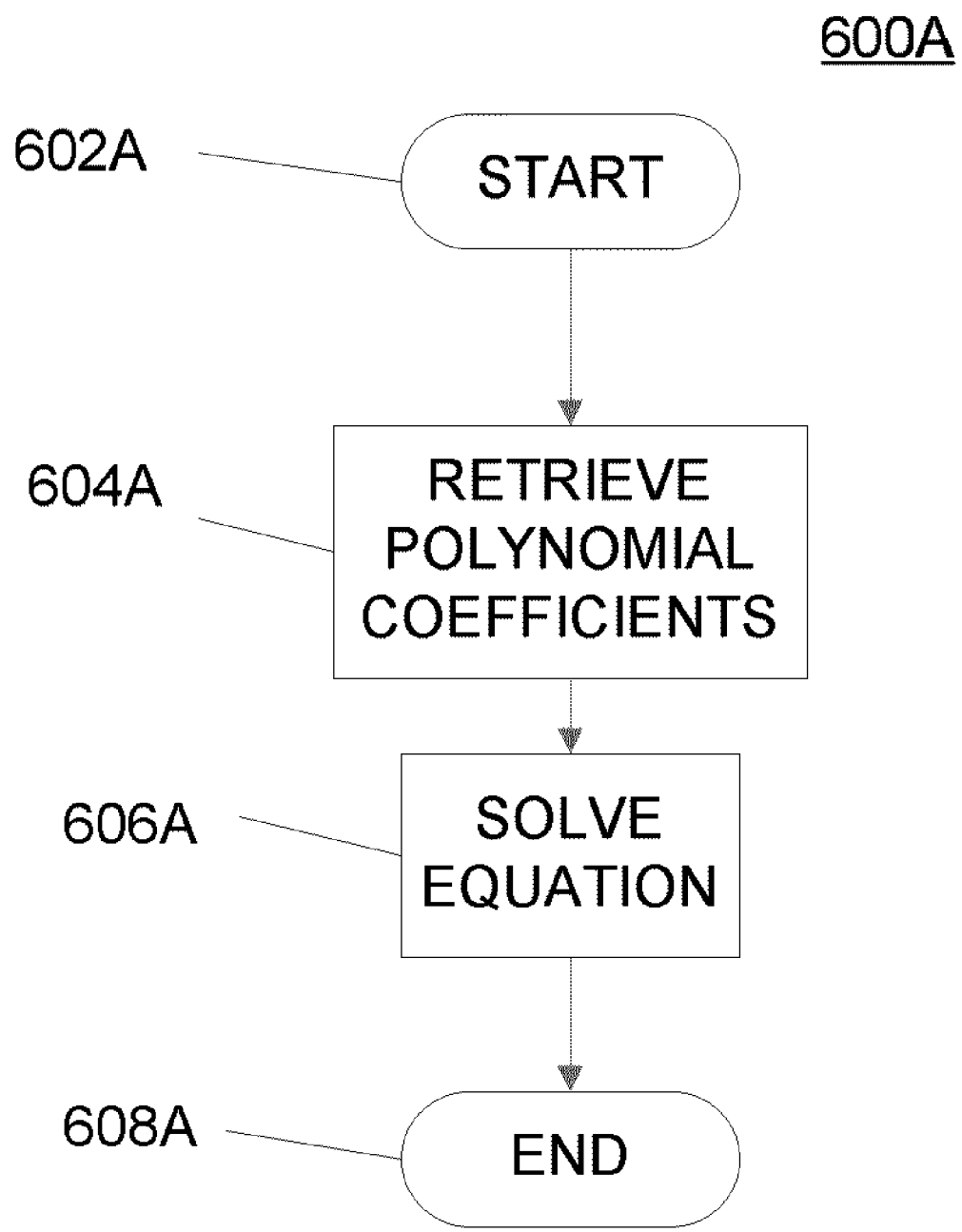
FIG._6A

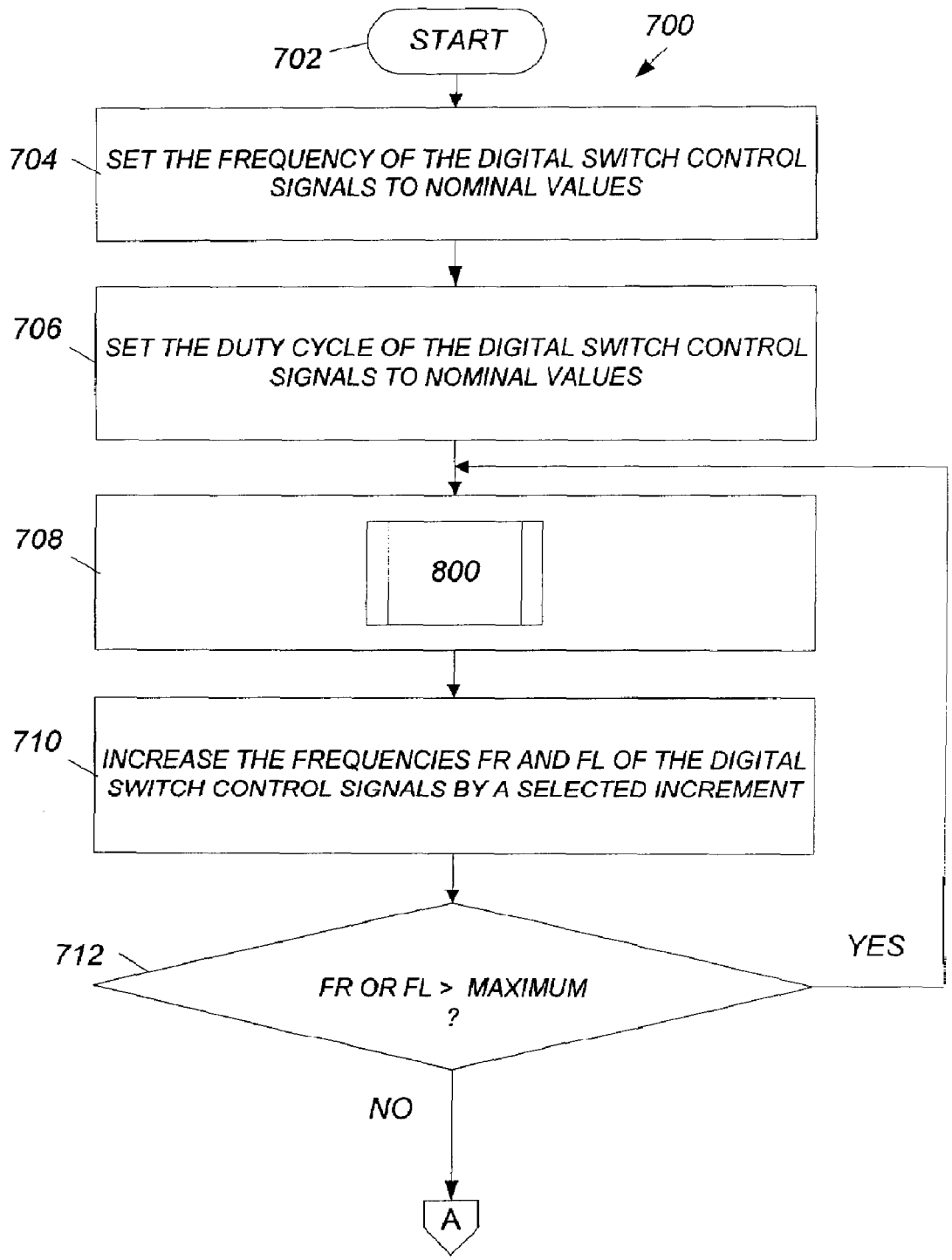
FIG._7A

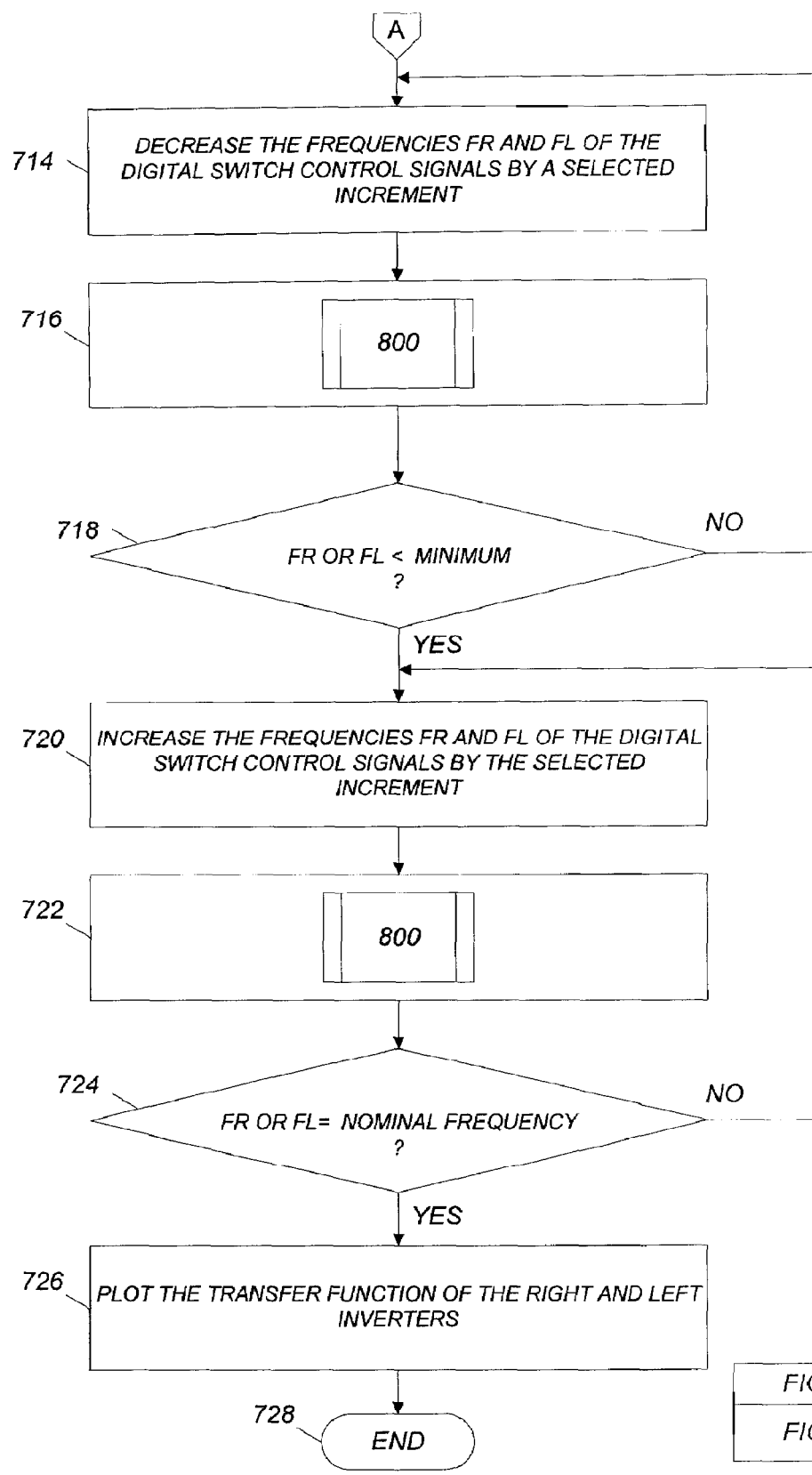

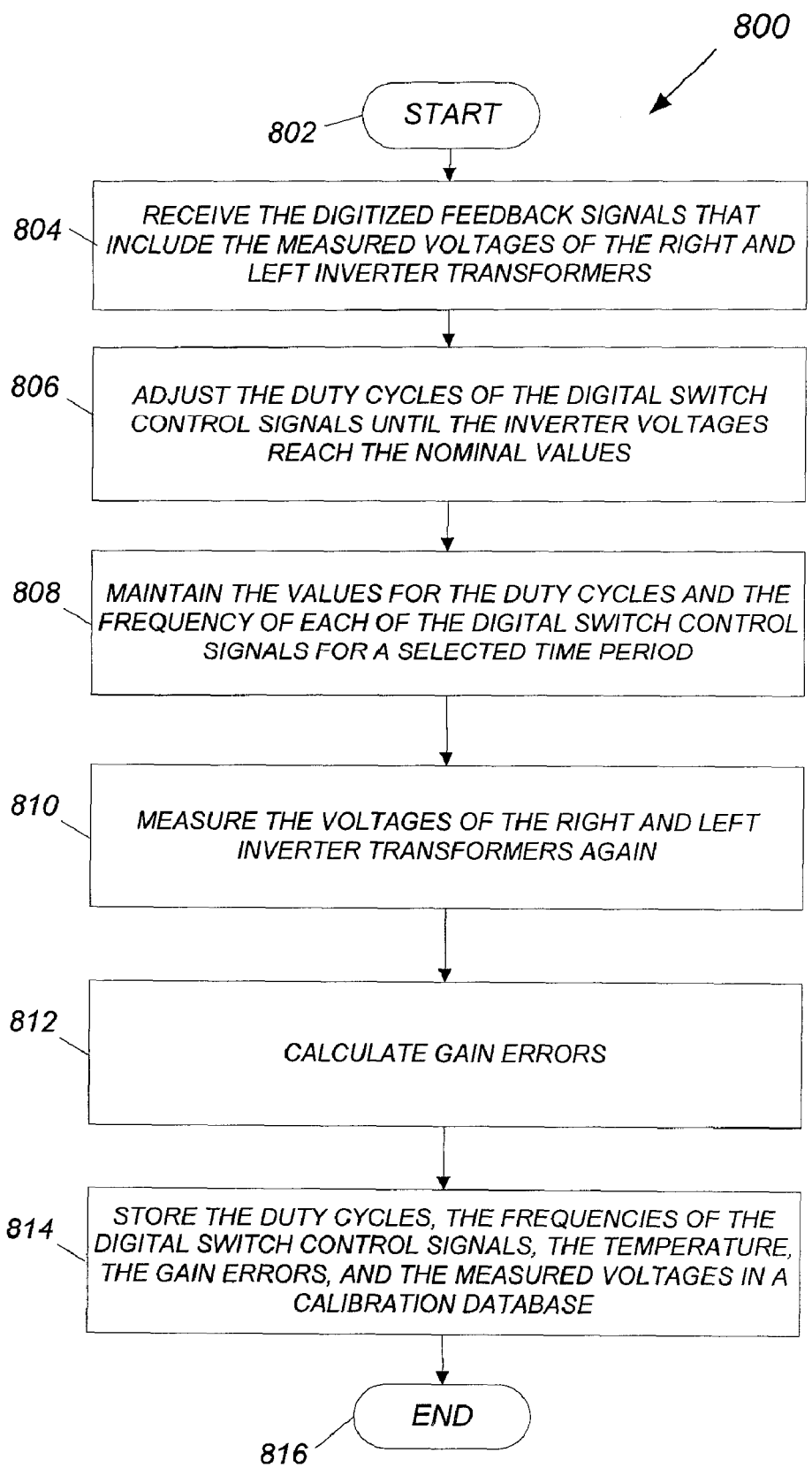
FIG._8

METHOD AND FIRMWARE FOR CONTROLLING AN INVERTER VOLTAGE BY DRIVE SIGNAL FREQUENCY

CROSS-REFERENCES TO RELATED APPLICATIONS

This application claims the benefit of U.S. Provisional Application No. 60/893,102 filed on Mar. 5, 2007, entitled METHOD AND FIRMWARE FOR CONTROLLING AN INVERTER VOLTAGE DRIVE SIGNAL FREQUENCY, which is hereby expressly incorporated by reference in its entirety for all purposes.

BACKGROUND OF THE INVENTION

1. Field of the Invention

The present invention is directed to controlling arrays of fluorescent lamps. More specifically, but without limitation thereto, the present invention is directed to a method and firmware for controlling an inverter voltage as a function of frequency in a fluorescent lamp array.

2. Description of Related Art

Fluorescent lamp arrays are typically incorporated into backlights for liquid crystal displays (LCD), for example, in computers and television receivers. The voltage for the fluorescent lamps is typically generated by an inverter circuit that switches a DC voltage to produce an alternating current in the primary winding of a voltage step-up transformer.

SUMMARY OF THE INVENTION

In one embodiment, a method of controlling an inverter voltage includes steps of:

receiving as input a digitized feedback signal representative of an inverter voltage that varies with frequency according to a transfer function;

calculating a frequency of a digital switch control signal in firmware in an inverter voltage microcontroller by the transfer function from the digitized feedback signal to adjust the inverter voltage to a set point value; and generating the digital switch control signal having the calculated frequency by firmware in the inverter voltage microcontroller as output to generate the inverter voltage at the set point value.

BRIEF DESCRIPTION OF THE DRAWINGS

The above and other aspects, features and advantages will become more apparent from the description in conjunction with the following drawings presented by way of example and not limitation, wherein like references indicate similar elements throughout the several views of the drawings, and wherein:

FIG. 1 illustrates a block diagram of a microcontroller circuit for controlling voltage and current in a fluorescent lamp array;

FIG. 2 illustrates a plot of inverter voltage as a function of frequency for the microcontroller circuit of FIG. 1;

FIG. 3 illustrates a flow chart of a method of controlling an inverter voltage as a function of frequency for the microcontroller circuit of FIG. 1;

FIG. 4 illustrates a flow chart for a method of generating a table for calculating the frequency of the digital switch control signal from a table lookup for the IFE of FIG. 3;

FIG. 5 illustrates a flow chart for a method of calculating the frequency of the digital switch control signal from a table lookup for the IFE of FIG. 3;

FIG. 6 illustrates a flow chart for a method of generating polynomial coefficients for calculating the frequency of the digital switch control signal from a polynomial function for the IFE of FIG. 3;

FIG. 6A illustrates a flow chart for a method of calculating the frequency of the digital switch control signal from a polynomial function.

FIG. 7 illustrates a flow chart for a method of analyzing the transfer function of the inverter voltage for the IFE of FIG. 3;

FIG. 8 illustrates a flow chart for calculating gain error for the method of FIG. 7; and FIG. 9 illustrates a schematic diagram 900 of a closed loop digital servo for adjusting the frequency of the digital switch control signals for the IFE of FIG. 3.

Elements in the figures are illustrated for simplicity and clarity and have not necessarily been drawn to scale. For example, the dimensions, sizing, and/or relative placement of some of the elements in the figures may be exaggerated relative to other elements to clarify distinctive features of the illustrated embodiments. Also, common but well-understood elements that may be useful or necessary in a commercially feasible embodiment are often not depicted in order to facilitate a less obstructed view of the illustrated embodiments.

DESCRIPTION OF THE ILLUSTRATED EMBODIMENTS

The following description is not to be taken in a limiting sense, rather for the purpose of describing by specific examples the general principles that are incorporated into the illustrated embodiments. For example, certain actions or steps may be described or depicted in a specific order to be performed. However, practitioners of the art will understand that the specific order is only given by way of example and that the specific order does not exclude performing the described steps in another order to achieve substantially the same result. Also, the terms and expressions used in the description have the ordinary meanings accorded to such terms and expressions in the corresponding respective areas of inquiry and study except where other meanings have been specifically set forth herein. The term "firmware" is used interchangeably with and means the same as the phrase "a computer readable storage medium tangibly embodying instructions that when executed by a computer implement a method".

Previously, discrete analog components have been used in inverters to generate the timing frequencies and voltage levels used to drive fluorescent lamp arrays. However, as the performance requirements for fluorescent lamp arrays become more stringent with regard to maintaining a light output within a narrow tolerance for each fluorescent lamp, the instability of analog component behavior due to varying operating temperature, manufacturing variations, and aging becomes a problem. Another problem found in inverters is that the inverter voltage varies as a function of frequency according to a transfer function that is dependent on the resistance, capacitance, and inductance of the components in the inverter and in the load being driven by the inverter.

FIG. 1 illustrates a block diagram of a microcontroller circuit 100 for controlling voltage and current in a fluorescent lamp array. Shown in FIG. 1 are an inverter voltage microcontroller 102, a pulse-width modulation (PWM) bridge driver 104, inverter bridges 106 and 108, inverter transformers 110 and 112, an array of fluorescent lamps 114, a load current microcontroller 116, digital switch control signals 118 and 120, switching signals 122 and 124, voltage feedback signals 126 and 128, a dimming control signal (IPWM) 130, and a load feedback signal 132.

The microcontroller circuit 100 includes two inverters to provide left-to-right brightness balance for large displays and to halve the inverter voltage required from each inverter, advantageously reducing high voltage hazards such as arcing in the transformer and in components on the circuit board on which the components of the microcontroller circuit 100 are mounted. Alternatively, a single inverter may be used to practice other embodiments within the scope of the appended claims.

In FIG. 1, the inverter voltage microcontroller 102 may be implemented, for example, as an integrated circuit microcomputer that can execute instructions from firmware located on-chip. The firmware in the inverter voltage microcontroller 102 is also referred to herein as the inverter firmware engine (IFE). The pulse-width modulation (PWM) bridge driver 104 may be implemented, for example, as a digital circuit that receives the digital switch control signals 118 and 120 from the inverter voltage microcontroller 102 and generates the switching signals 122 and 124 for the inverter bridges 106 and 108, respectively. The PWM inverter bridge driver 104 is connected directly to a digital output port of the inverter voltage microcontroller 102 and preferably does not include analog timing components. The inverter bridge 106 may be implemented, for example, as an H-bridge, or full bridge, using common digital switching components. The inverter transformers 110 and 112 may each be implemented, for example, as a pair of transformers connected in parallel to reduce the height of a circuit board used to mount the components of the microcontroller circuit 100. The fluorescent lamps 114 may be implemented, for example, as any type of light-emitting device driven by an inverter, including cold-cathode fluorescent lamps (CCFL) and external electrode fluorescent lamps (EEFL).

In operation, the inverter voltage microcontroller 102 sets the inverter voltage output from each of the inverter transformers 110 and 112 to strike the array of fluorescent lamps 114 and to maintain sufficient load current through each of the fluorescent lamps 114 to provide the desired light output. The load current may be measured and included in the load feedback signal 132 according to well-known techniques. Other parameters such as the temperature of the fluorescent lamps 114 may also be included in the load feedback signal 132. The inverter voltage output from each of the inverter transformers 110 and 112 may be measured, for example, from a voltage divider and digitized according to well-known techniques to generate the voltage feedback signals 126 and 128.

FIG. 2 illustrates a plot 200 of inverter voltage as a function of frequency for the microcontroller circuit 100 of FIG. 1. Shown in FIG. 2 are transfer functions 202 and 204.

In FIG. 2, the transfer functions 202 and 204 are examples that exhibit a resonance and peak voltage responses. The difference between the transfer functions 202 and 204 may be due, for example, to component variation between the two inverter transformers 110 and 112, or to different temperatures of the same inverter transformer. At a given inverter frequency F, the difference in voltage response between V1 and V2 in FIG. 2 may be so large that arcing may occur in the inverter transformer 110 or 112 or in other components of the inverter circuit. At the other extreme, the difference in voltage response may result in an inverter voltage that is too low to strike the fluorescent lamps 114.

In previous attempts to solve the problem of maintaining stable voltage output with changes in frequency and temperature, the inverter transformers 110 and 112 and other inverter components are selected within close tolerances and similar temperature coefficients. However, imposing close tolerances on components disadvantageously increases the production cost of the inverter. A preferable solution is to characterize the transfer function at different temperatures during assembly and to drive the inverter at a frequency and duty cycle that produces the desired set point of the inverter voltage at the operating temperature. Another solution is to measure the transfer function dynamically, advantageously avoiding the necessity of characterizing the transfer function during assembly.

In one embodiment, a method of controlling an inverter voltage includes steps of:

receiving as input a digitized feedback signal representative of an inverter voltage that varies with frequency according to a transfer function;

calculating a frequency of a digital switch control signal in firmware in an inverter voltage microcontroller by the transfer function from the digitized feedback signal to adjust the inverter voltage to a set point value; and generating the digital switch control signal having the calculated frequency by firmware in the inverter voltage microcontroller as output to generate the inverter voltage at the set point value.

FIG. 3 illustrates a flow chart 300 of a method of controlling an inverter voltage as a function of frequency for the microcontroller circuit 100 of FIG. 1.

Step 302 is the entry point of the flow chart 300.

In step 304, a digitized feedback signal representative of an inverter voltage that varies with frequency according to a transfer function is received as input to the inverter firmware engine (IFE). The digitized feedback signal may be generated, example, by a voltage divider at the output of each of the inverter transformers 110 and 112 and an analog-to-digital converter. In another embodiment, the digitized feedback signal includes the temperature of one or more of the inverter components.

In step 306, the inverter firmware engine (IFE) calculates a frequency of the digital switch control signal 118 or 120 in FIG. 1 by the transfer function from the digitized feedback signal to adjust the inverter voltage to a set point value. The frequency may be calculated by the transfer function, for example, according to one of the following methods: table lookup, polynomial equation, and dynamic transfer function measurement. Each of these methods is described in detail below.

In step 308, the inverter firmware engine (IFE) generates the digital switch control signal 118 or 120 having the calculated frequency as output to the inverter bridge driver 104 in FIG. 1 to generate the inverter voltage at the set point value. In one embodiment, the frequency is changed from the current value to the calculated value gradually to avoid display flicker, for example, by a closed loop digital servo.

Step 310 is the exit point of the flow chart 300.

FIG. 4 illustrates a flow chart 400 for a method of generating a table for calculating the frequency of the digital switch control signal from a table lookup for the IFE of FIG. 3.

Step 402 is the entry point of the flow chart 400.

In step 404, the inverter firmware engine (IFE) drives the inverter voltage to a nominal voltage level measured by the feedback signal with a digital switch control signal at a selected frequency after the inverter is assembled with the load. For example, the selected frequency may be 55 KHz. Preferably, the selected frequency is selected below the resonance peak of the transfer function.

In step 406, the inverter firmware engine (IFE) increases the frequency of the digital switch control signal by a selected increment, for example, 1 KHz.

In step 408, the inverter firmware engine (IFE) measures the inverter voltage via the digitized feedback signal.

In step 410, the inverter firmware engine (IFE) records the frequency and the difference between the inverter voltage and the nominal voltage in a table of transfer function values.

In step 412, the inverter firmware engine (IFE) adjusts the duty cycle of the digital switch control signal to restore the inverter voltage to the nominal voltage level.

In step 414, if the frequency of the digital switch control signal is less than a selected maximum operating frequency, for example, 100 KHz, then the method continues from step 406. Otherwise, the method continues from step 416.

In step 416, the inverter firmware engine (IFE) normalizes the table of transfer function values to nominal voltage gain as a function of frequency within a frequency range that preferably includes the resonance peak.

In step 418, the inverter firmware engine (IFE) stores the table of transfer function values, for example, in a calibration database in the IFE. Alternatively, the selected frequency may be selected above the resonance peak, for example, 100 kHz, and decremented in steps to generate the table of transfer function values. In another embodiment, the dimension of temperature may be added to the table of transfer function values, and the procedure described above may be repeated for a range of temperature values, for example, during a calibration performed after assembly of the inverter in an application.

Step 420 is the exit point of the flow chart 400.

FIG. 5 illustrates a flow chart 500 for a method of calculating the frequency of the digital switch control signal from a table lookup for the IFE of FIG. 3.

Step 502 is the entry point of the flow chart 500.

In step 504, the inverter firmware engine (IFE) calculates a gain needed to adjust the inverter voltage measured by the feedback signal to the set point value.

In step 506, the inverter firmware engine (IFE) looks up the frequency corresponding to the calculated gain in the table of transfer function values generated, for example, by the method of FIG. 4 according to well-known table lookup programming techniques. Interpolation may be used according to well-known techniques to achieve greater precision. In another embodiment, temperature may be included in the feedback signal and included in the table lookup to find the frequency corresponding to the calculated gain and the inverter temperature.

Step 508 is the exit point of the flow chart 500.

FIG. 6 illustrates a flow chart 600 for a method of generating polynomial coefficients for calculating the frequency of the digital switch control signal from a polynomial function for the IFE of FIG. 3.

Step 602 is the entry point of the flow chart 600.

In step 604, the inverter firmware engine (IFE) characterizes the transfer function of the inverter voltage, for example, by the table of transfer function values described with reference to FIG. 4.

In step 606, the inverter firmware engine (IFE) calculates a set of polynomial coefficients from the transfer function according to well-known mathematical techniques that satisfy the following equation:

$$G(F) = G0 + G1*F + G2*F^2 + G3*F^3 + \ldots \quad (1)$$

where G is the gain, F is the frequency, and Gi, i=0, 1, 2, ... are polynomial coefficients.

In step 608, the inverter firmware engine (IFE) stores the polynomial coefficients, for example, in a calibration database in the IFE. In another embodiment, a set of polynomial coefficients is calculated at each of several temperature points.

Step 610 is the exit point of the flow chart 600.

FIG. 6A illustrates a flow chart 600A for a method of calculating the frequency of the digital switch control signal from a polynomial function.

Step 602A is the entry point of the flow chart 600A.

In step 604A, the inverter firmware engine (IFE) retrieves the polynomial coefficients, for example, from the calibration database. In one embodiment, the polynomial coefficients are retrieved for a selected temperature.

In step 606A, the inverter firmware engine (IFE) solves equation (1) for F by substituting the gain required to adjust the inverter voltage to the set point value for G.

Step 608A is the exit point of the flow chart 600A.

In another embodiment, the transfer function is measured dynamically to adjust the frequency of the digital switch control signal. In this method, changes due to component aging are advantageously accounted for automatically. In one embodiment, the method of FIG. 4 is repeated, for example, every five seconds while the inverter is use, in contrast to recording calibration data before the inverter is used by an application. The only other difference from the method of FIG. 4 is that the nominal voltage level is changed to the set point value.

FIG. 7 illustrates a flow chart 700 for a method of analyzing the transfer function of the inverter voltage for the IFE of FIG. 3.

Step 702 is the entry point of the flow chart 700.

In step 704, the inverter firmware engine (IFE) sets the frequency of the digital switch control signals 118 and 120 to nominal values FR0 and FL0 for the right and left inverter transformers 110 and 112, respectively. In one embodiment, the values for FR0 and FL0 are identical.

In step 706, the inverter firmware engine (IFE) sets the duty cycle of the digital switch control signals 118 and 120 to nominal values DCR0 and DCL0 for the right and left inverter transformers 110 and 112, respectively. In one embodiment, the values for DCR0 and DCL0 are identical. The nominal values for DCR0 and DCL0 are selected to generate nominal inverter voltages VRN and VLN from the right and left inverter transformers 110 and 112, respectively.

In step 708, the inverter firmware engine (IFE) calculates the gain error by performing the steps in FIG. 8.

In step 710, the inverter firmware engine (IFE) increases the frequencies FR and FL of the digital switch control signals 118 and 120 by a selected increment DF, for example, 500 Hz according to the following equations:

$$FR = FR + DF, FL = FL + DF \quad (2)$$

In step 712, if FR or FL is greater than a maximum frequency limit, then the method continues from step 712. Otherwise, the method continues from step 708.

In step 714, the inverter firmware engine (IFE) decreases the frequencies FR and FL of the digital switch control signals 118 and 120 by the selected increment DF according to the following equations:

$$FR = FR - DF, FL = FL - DF \quad (3)$$

In step 716, the inverter firmware engine (IFE) measures the gain error by performing the steps in FIG. 8.

In step 718, if FR or FL is less than a minimum frequency limit, then the method continues from step 718. Otherwise, the method continues from step 712.

In step 720, the inverter firmware engine (IFE) increases the frequencies FR and FL of the digital switch control signals by the selected increment according to equations (3).

In step 722, the inverter firmware engine (IFE) measures the gain error by performing the steps in FIG. 8.

In step 724, if FR equals FR0 or if FL equals FL0, then the method continues from step 724. Otherwise, the method continues from step 720.

In step 726, the inverter firmware engine (IFE) plots the transfer functions GR and GL for the frequency range FRMIN to FRMAX and FLMIN to FLMAX for the right and left inverters, respectively. The plots of the transfer functions GR and GL may be displayed, for example, via a graphical user interface connected to the inverter voltage microcontroller 102 to assist circuit designers in identifying resonant frequencies of the inverter circuits.

Step 728 is the exit point of the flow chart 700.

FIG. 8 illustrates a flow chart 800 for calculating gain error for the method of FIG. 7.

Step 802 is the entry point of the flow chart 800.

In step 804, the inverter firmware engine (IFE) receives the digitized feedback signals 126 and 128 that include the measured voltages VRM and VLM of the right and left inverter transformers 110 and 112, respectively.

In step 806, the inverter firmware engine (IFE) adjusts the duty cycles DCR and DCL of the digital switch control signals 118 and 120 until the inverter voltages reach the nominal values VRN and VLN.

In step 808, the inverter firmware engine (IFE) maintains the values for the duty cycles DCR and DCL and the frequency of each of the digital switch control signals 118 and 120 for a selected time period, for example, three seconds.

In step 810, the inverter firmware engine (IFE) measures the voltages VRM and VLM of the right and left inverter transformers 110 and 112 again.

In step 812, the inverter firmware engine (IFE) calculates the gain errors GR and GL according to the following equations:

$$GR=VRN/VRM,\ GL=VLN/VLM \quad (4)$$

In step 814, the inverter firmware engine (IFE) stores the duty cycles DCR and DCL, the frequencies FR and FL of the digital switch control signals 118 and 120, the temperature, the gain errors GR and GL, and the measured voltages VRM and VLM, for example, in a calibration database.

Step 816 is the exit point of the flow chart 800.

FIG. 9 illustrates a schematic diagram 900 of a closed loop digital servo for adjusting the frequency of the digital switch control signals for the IFE of FIG. 3. Shown in FIG. 9 are a calculated frequency of a digital control signal 902, an inverter frequency 904, a summing function 906, a proportional integral servo 908, and an adjustment value 910.

In FIG. 9, the inverter firmware engine (IFE) subtracts the inverter frequency 904 from the calculated frequency of a digital control signal 902 by the summing function 906 to generate the error signal err according to the equation:

$$err=\text{Calculated\_Frequency}-\text{Inverter\_Frequency} \quad (5)$$

The resulting error signal err from the summing function 906 is subjected to the proportional integral servo 1308 to generate the adjustment value 910 for the selected parameter according to the equation:

$$\text{Adjustment\_value}=(\alpha*err+int\_last)*KG \quad (6)$$

where
Adjustment_value is the integrated error output;
$\alpha$ is a feedback constant;

int_last is the cumulative sum of the current and previous values of err; and $K_G$ is a loop gain constant.

In one embodiment, the loop gain $K_G=1.975\times10^{-3}$ and $\alpha=39.5$ to provide a damping ratio of 0.9 to allow for open loop variation tolerances. In this example, the servo loop is performed at periodic intervals of two seconds.

The error signal err is summed with the previous errors:

$$int\_last=int\_last+err \quad (7)$$

The proportional integral servo 908 is preferably embodied in the IFE according to well-known programming techniques to generate the adjustment value 910.

Although the flowcharts described above show specific steps performed in a specific order, these steps may be combined, sub-divided, or reordered within the scope of the appended claims. Unless specifically indicated, the order and grouping of steps is not a limitation of other embodiments that may lie within the scope of the claims.

The flow charts described above for the IFE may be embodied in a disk, a CD-ROM, and other tangible computer readable media for loading and executing on a computer according to well-known computer programming techniques.

While the embodiments described above are generally intended for an array of fluorescent lamps, other embodiments may also be practiced within the scope of the appended claims for other electrical loads.

The specific embodiments and applications thereof described above are for illustrative purposes only and do not preclude modifications and variations that may be made within the scope of the following claims.

What is claimed is:

1. A method of controlling an inverter voltage outputted by an inverter and used to drive a lamp array, the method comprising:
    measuring and digitizing the inverter voltage to generate a voltage feedback signal, wherein the inverter voltage varies with frequency according to a transfer function that is dependent on electrical characteristics of components in the inverter;
    providing the voltage feedback signal to a microcontroller and determining the transfer function, at least in part, from the voltage feedback signal;
    providing to the microcontroller, in addition to said providing the voltage feedback signal from which the transfer function is determined, a load feedback signal from the lamp array;
    determining, by the microcontroller based on the transfer function and the voltage feedback signal, a frequency of a digital switch control signal to adjust the inverter voltage to a set point value; and
    generating the digital switch control signal having the determined frequency.

2. The method of claim 1, further comprising:
    receiving, as feedback, a temperature measurement of one of the components in the inverter;
    wherein said determining a frequency is further based on the temperature measurement.

3. The method of claim 1, further comprising:
    adjusting a duty cycle of the digital switch control signal to maintain the inverter voltage at the set point value.

4. The method of claim 3, wherein said adjusting a duty cycle comprises adjusting the duty cycle with a closed-loop servo.

5. The method of claim 3, wherein said adjusting a duty cycle comprises adjusting the duty cycle based on a lookup table.

6. The method of claim 3, wherein said adjusting a duty cycle comprises adjusting the duty cycle based on a polynomial function having stored coefficients.

7. The method of claim 1, wherein the inverter voltage is a first inverter voltage produced by a first transformer, the voltage feedback signal is a first voltage feedback signal, the transfer function is a first transfer function, the determined frequency is a first determined frequency, and the digital switch control signal is a first digital switch control signal used to control the first transformer, and wherein the method further comprises:
measuring and digitizing a second inverter voltage, produced by a second transformer, to generate a second voltage feedback signal, wherein the second inverter voltage varies with frequency according to a second transfer function;
determining, based on the second transfer function and the second feedback signal, a second frequency of the second digital switch control signal; and
generating a second digital switch control signal having the second determined frequency.

8. The method of claim 7, wherein the first and second determined frequencies are different frequencies.

9. The method of claim 8, wherein the second determined frequency of the second digital switch control signal is configured to adjust the second inverter voltage to the set point value.

10. The method of claim 1, wherein said measuring the inverter voltage comprises measuring the inverter voltage with a voltage divider.

11. The method of claim 1, further comprising characterizing the transfer function throughout operation of the lamp array.

12. The method of claim 1, wherein the electrical characteristics comprise resistance, capacitance, and inductance of the components in the inverter.

13. A method of controlling an inverter voltage outputted by an inverter and used to drive a lamp array, the method comprising:
measuring and digitizing the inverter voltage to generate a voltage feedback signal, wherein the inverter voltage varies with frequency according to a transfer function;
determining, by a microcontroller based on the transfer function and the voltage feedback signal, a frequency of a digital switch control signal to adjust the inverter voltage to a set point value; and
generating the digital switch control signal having the determined frequency, wherein said determining a frequency comprises:
determining, based on the voltage feedback signal, a gain to adjust the inverter voltage to the set point value; and
identifying, based on a lookup table, the determined frequency that corresponds to the determined gain.

14. A method of controlling an inverter voltage outputted by an inverter and used to drive a lamp array, the method comprising:
measuring and digitizing the inverter voltage to generate a voltage feedback signal, wherein the inverter voltage varies with frequency according to a transfer function;
determining, by a microcontroller based on the transfer function and the voltage feedback signal, a frequency of a digital switch control signal to adjust the inverter voltage to a set point value; and
generating the digital switch control signal having the determined frequency, wherein said determining a frequency comprises:
determining a set of polynomial coefficients;
determining, based on the voltage feedback signal, a gain to adjust the inverter voltage to the set point value; and
identifying the determined frequency based on the set of polynomial coefficients and the determined gain.

15. A method of controlling an inverter voltage outputted by an inverter and used to drive a lamp array, the method comprising:
measuring and digitizing the inverter voltage to generate a voltage feedback signal, wherein the inverter voltage varies with frequency according to a transfer function;
determining, by a microcontroller based on the transfer function and the voltage feedback signal, a frequency of a digital switch control signal to adjust the inverter voltage to a set point value; and
generating the digital switch control signal having the determined frequency, wherein said generating the digital switch control signal comprises:
determining, with a closed-loop servo, an adjustment value; and
generating the digital switch control signal having the determined frequency based on the adjustment value.

16. An apparatus, comprising:
an inverter;
a transformer coupled to the inverter and configured to:
use an inverter voltage from the inverter to drive a lamp array, wherein the inverter voltage varies with frequency according to a transfer function that is dependent on electrical characteristics of components in the inverter; and
provide a voltage feedback signal corresponding to the inverter voltage; and
a controller coupled to the transformer and configured to:
receive the voltage feedback signal provided by the transformer and determine the transfer function at least in part, from the received voltage feedback signal;
receive, in addition to the voltage feedback signal from which the transfer function is determined, a load feedback signal from the lamp array;
determine a frequency of a digital switch control signal based on the transfer function and the voltage feedback signal; and
generate the digital switch control signal having the determined frequency to adjust the inverter voltage to a set point value.

17. The apparatus of claim 16, wherein the transformer is a first transformer, the inverter voltage is a first inverter voltage, the voltage feedback signal is a first voltage feedback signal, the transfer function is a first transfer function, the determined frequency is a first determined frequency, and the digital switch control signal is a first digital switch control signal, and wherein the apparatus further comprises:
a second transformer configured to:
provide a second inverter voltage, wherein the second inverter voltage varies with frequency according to a second transfer function; and
provide a second voltage feedback signal corresponding to the second inverter voltage;
wherein the controller is further configured to:
determine a second frequency of a second digital switch control signal based on the second transfer function and the second voltage feedback signal; and
generate the second digital switch control signal having the second determined frequency to adjust the second inverter voltage.

18. The apparatus of claim 16, further comprising:
the lamp array including a fluorescent lamp array.

19. The apparatus of claim 16, wherein the controller is further configured to adjust a duty cycle of the digital switch control signal to maintain the inverter voltage at the set point value.

20. The apparatus of claim 16, wherein the electrical characteristics comprise resistance, capacitance, and inductance of the components in the inverter.

21. An apparatus, comprising:
an inverter;
a transformer coupled to the inverter and configured to:
    use an inverter voltage from the inverter to drive a lamp array, wherein the inverter voltage varies with frequency according to a transfer function; and
    provide a voltage feedback signal corresponding to the inverter voltage and
a controller coupled to the transformer and configured to:
    determine a frequency of a digital switch control signal based on the transfer function and the voltage feedback signal; and
    generate the digital switch control signal having the determined frequency to adjust the inverter voltage to a set point value, wherein the controller is further configured to determine the determined frequency by being configured to:
    determine, based on the voltage feedback signal, a gain to adjust the inverter voltage to the set point value; and
    identify, based on a lookup table, the determined frequency that corresponds to the determined gain.

22. An apparatus, comprising:
an inverter;
a transformer coupled to the inverter and configured to:
    use an inverter voltage from the inverter to drive a lamp array, wherein the inverter voltage varies with frequency according to a transfer function; and
    provide a voltage feedback signal corresponding to the inverter voltage and
a controller coupled to the transformer and configured to:
    determine a frequency of a digital switch control signal based on the transfer function and the voltage feedback signal; and
    generate the digital switch control signal having the determined frequency to adjust the inverter voltage to a set point value, wherein the controller is further configured to determine the determined frequency by being configured to:
    determine a set of polynomial coefficients;
    determine, based on the voltage feedback signal, a gain to adjust the inverter voltage to the set point value; and
    identify the determined frequency based on the set of polynomial coefficients and the determined gain.

23. An apparatus, comprising:
an inverter;
a transformer coupled to the inverter and configured to:
    use an inverter voltage from the inverter to drive a lamp array, wherein the inverter voltage varies with frequency according to a transfer function; and
    provide a voltage feedback signal corresponding to the inverter voltage; and
a controller coupled to the transformer and configured to:
    determine a frequency of a digital switch control signal based on the transfer function and the voltage feedback signal; and
    generate the digital switch control signal having the determined frequency to adjust the inverter voltage to a set point value, wherein the controller is further configured to generate the digital switch control signal by being configured to:
    determine, with a closed-loop servo, an adjustment value; and
    generate the digital switch control signal having the determined frequency based on the adjustment value.

24. An article of manufacture including a computer-readable medium having instructions stored thereon that, if executed by a computing device, cause the computing device to perform operations comprising:
    measuring and digitizing an inverter voltage, outputted by an inverter and used to drive a lamp array, to generate a voltage feedback signal, wherein the inverter voltage varies with frequency according to a transfer function that is dependent on electrical characteristics of components in the inverter;
    determining the transfer function at least in part from the generated voltage feedback signal;
    generating, in addition to the generated voltage feedback signal from which the transfer function is determined, a load feedback signal from the lamp array;
    determining, based on the transfer function and the voltage feedback signal, a frequency of a digital switch control signal to adjust the inverter voltage to a set point value; and
    generating the digital switch control signal having the determined frequency.

25. The article of manufacture of claim 24, wherein the instructions, if executed by the computing device, further cause the computing device to perform operations comprising:
    receiving, as feedback, a temperature measurement of one of the components in the inverter;
    wherein said determining a frequency is further based on the temperature measurement.

26. The article of manufacture of claim 24, wherein the electrical characteristics comprise resistance, capacitance, and inductance of the components in the inverter.

27. An article of manufacture including a computer-readable medium having instructions stored thereon that, if executed by a computing device, cause the computing device to perform operations comprising:
    measuring and digitizing voltage, outputted by an inverter and used to drive a lamp array, to generate a voltage feedback signal wherein the inverter voltage varies with frequency according to a transfer function;
    determining based on the transfer function and the voltage feedback signal, a frequency of a digital switch control signal to adjust the inverter voltage to a set point value; and
    generating the digital switch control signal having the determined frequency, wherein said determining a frequency comprises:
    determining, based on the voltage feedback signal, a gain to adjust the inverter voltage to the set point value; and
    identifying, based on a lookup table, the determined frequency that corresponds to the determined gain.

28. An article of manufacture including a computer-readable medium having instructions stored thereon that, if executed by a computing device, cause the computing device to perform operations comprising:
    measuring and digitizing an inverter voltage, outputted by an inverter and used to drive a lamp array, to generate a voltage feedback signal, wherein the inverter voltage varies with frequency according to a transfer function;

determining, based on the transfer function and the voltage feedback signal, a frequency of a digital switch control signal to adjust the inverter voltage to a set point value; and generating the digital switch control signal having the determined frequency, wherein said determining a frequency comprises:
determining a set of polynomial coefficients;
determining, based on the voltage feedback signal, a gain to adjust the inverter voltage to the set point value; and
identifying the determined frequency based on the set of polynomial coefficients and the determined gain.

29. An apparatus, comprising:
means for measuring and digitizing an inverter voltage, outputted by an inverter and used to drive a lamp array, to generate a voltage feedback signal, wherein the inverter voltage varies with frequency according to a transfer function that is dependent on electrical characteristics of components in the inverter;
means for determining the transfer function at least in part, from the generated voltage feedback signal;
means for providing, in addition to the generated voltage feedback signal from which the transfer function is determined, a load feedback signal from the lamp array;
means for determining, based on the transfer function and the voltage feedback signal, a frequency of a digital switch control signal to adjust the inverter voltage to a set point value; and
means for generating the digital switch control signal having the determined frequency.

30. The apparatus of claim 29 wherein the electrical characteristics comprise resistance, capacitance, and inductance of the components in the inverter.

31. An apparatus, comprising:
means for measuring and digitizing an inverter voltage, outputted by an inverter and used to drive a lamp array, to generate a voltage feedback signal, wherein the inverter voltage varies with frequency according to a transfer function;
means for determining, based on the transfer function and the voltage feedback signal, a frequency of a digital switch control signal to adjust the inverter voltage to a set point value; and
means for generating the digital switch control signal having the determined frequency, wherein said means for determining comprises:
means for determining, based on the voltage feedback signal, a gain to adjust the inverter voltage to the set point value; and
means for identifying, based on a lookup table or a set of polynomial coefficients, the determined frequency that corresponds to the determined gain.

32. A system, comprising:
a lamp array;
an inverter;
circuitry coupling the inverter to the lamp array and configured to:
use an inverter voltage from the inverter to drive the lamp array, wherein the inverter voltage varies with frequency according to a transfer function that is dependent on electrical characteristics of components in the inverter; and
provide a voltage feedback signal corresponding to the inverter voltage; and
a controller coupled to the circuitry and configured to:
receive the voltage feedback signal provided by the transformer and determine the transfer function, at least in part, from the received voltage feedback signal;
receive, in addition to the voltage feedback signal from which the transfer function is determined, a load feedback signal from the lamp array;
determine a frequency of a digital switch control signal based on the transfer function and the voltage feedback signal; and
generate the digital switch control signal having the determined frequency to adjust the inverter voltage to a set point value.

33. The system of claim 32, wherein the electrical characteristics comprise resistance, capacitance, and inductance of the components in the inverter.

34. The system of claim 32, wherein the lamp array comprises part of a display of a computing device.

35. A system, comprising:
a lamp array;
an inverter;
circuitry coupling the inverter to the lamp array and configured to:
use an inverter voltage from the inverter to drive the lamp array, wherein the inverter voltage varies with frequency according to a transfer function; and
provide a voltage feedback signal corresponding to the inverter voltage; and
a controller coupled to the circuit and configured to:
determine a frequency of a digital switch control signal based on the transfer function and the voltage feedback signal;
generate the digital switch control signal having the determined frequency to adjust the inverter voltage to a set point value, wherein the controller is further configured to identify the determined frequency based on a frequency value in a lookup table that corresponds to a gain to adjust the inverter voltage to the set point value.

* * * * *

UNITED STATES PATENT AND TRADEMARK OFFICE
CERTIFICATE OF CORRECTION

| | | |
|---|---|---|
| PATENT NO. | : 8,111,012 B2 | Page 1 of 1 |
| APPLICATION NO. | : 12/042784 | |
| DATED | : February 7, 2012 | |
| INVENTOR(S) | : Sanchez | |

It is certified that error appears in the above-identified patent and that said Letters Patent is hereby corrected as shown below:

Column 10, line 36, in Claim 16, delete "function" and insert -- function, --.

Column 11, line 17, in Claim 21, delete "voltage and" and insert -- voltage; and --.

Column 11, line 38, in Claim 22, delete "voltage and" and insert -- voltage; and --.

Column 12, line 18, in Claim 24, delete "function at least in part" and insert -- function, at least in part, --.

Column 12, line 45, in Claim 27, delete "digitizing voltage," and insert -- digitizing an inverter voltage, --.

Column 12, line 47, in Claim 27, delete "signal" and insert -- signal, --.

Column 12, line 49, in Claim 27, delete "determining" and insert -- determining, --.

Column 13, line 21, in Claim 29, delete "function" and insert -- function, --.

Column 13, line 32, in Claim 30, delete "claim 29" and insert -- claim 29, --.

Column 13, line 35, in Claim 31, delete "comprising;" and insert -- comprising: --.

Column 14, line 42, in Claim 35, delete "circuit" and insert -- circuitry --.

Signed and Sealed this
Fourteenth Day of August, 2012

David J. Kappos
*Director of the United States Patent and Trademark Office*